Patented June 20, 1933

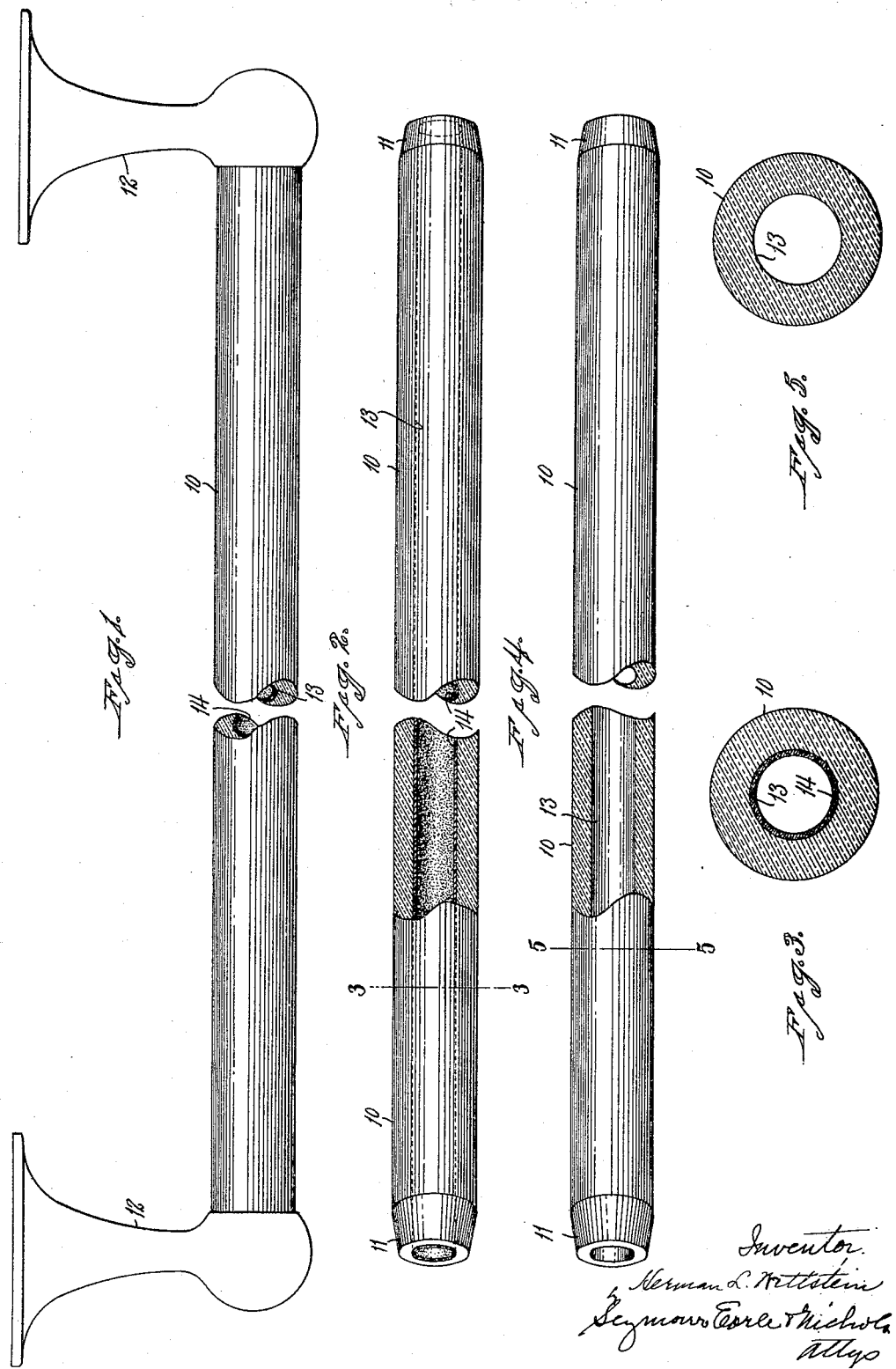

1,915,112

UNITED STATES PATENT OFFICE

HERMAN L. WITTSTEIN, OF NEW HAVEN, CONNECTICUT, ASSIGNOR TO THE ATLAS-ANSONIA COMPANY, OF NEW HAVEN, CONNECTICUT, A CORPORATION

HANGER FOR TOWELS AND THE LIKE

Application filed July 28, 1931. Serial No. 553,581.

This invention relates to so-called towel-bars or hangers for towels, and the like and is more particularly directed to improvements in colored towel-bars or hangers wherein the towel supporting surface is formed of glass. By the use of the term "color" herein, I wish to be understood as including in such term, for convenience of description, both black and white.

Heretofore, in the production of colored towel-bars, it has been the general practice to mix coloring matter with molten glass, the pigmentized glass being formed into rods or bars of the requisite length and circumference for supporting a towel or other article which it may be desired to suspend therefrom.

The usual mode of manufacture above described requires the exercise of great care in the selection of coloring matter, in the combining of such colored matter with the glass, and also in the handling and treatment of the glass so colored during its heat treatment, etc., otherwise the color obtained will be of varying and almost unpredictable hue and will appear in irregular density throughout the length of the rod. In other words, the process of manufacture described, while workable if a high order of technical skill and expensive equipment is employed and the consequent expense disregarded, is not adapted to the mass production of low-priced colored towel-bars.

The primary object of the present invention is to provide a hanger or so-called bar for towels and similar articles that may be suspended therefrom, in which the article-supporting surface is composed of glass treated with a coloring material which may be produced at an extremely low cost and which, in addition, will embody characteristics in coloration and in attractiveness that are not possessed by the type of bars of pigmentized glass composition heretofore referred to, thereby materially increasing the field of utility of articles of the kind.

It is also an object of my invention to provide a hanger or so-called towel bar in which the supporting surface for towels or other articles which may be suspended therefrom is formed of glass to which a coloring material is applied after the production of the supporting surface to obtain a supporting surface which, when completed, will have the appearance of, or simulate one composed of pigmentized glass or glass with which the coloring pigments are mixed while the glass is in a molten state preparatory to the formation of a bar or rod therefrom.

My invention further consists in a towel-bar as a new article of manufacture, having a tubular transparent bar; and a coating of initially-fluid coloring matter applied to the surface of the hollow interior of the said bar; whereby, without actually incorporating the coloring matter in the transparent material of the bar itself, the said coloring matter is shielded against wear and abrasion.

In the accompanying drawing:

Fig. 1 is a top or plan view of a colored towel-bar embodying my invention and shown as mounted in end-supports;

Fig. 2 is a detached perspective view of the tubular transparent bar proper with a portion thereof broken away and shown in section;

Fig. 3 is a view thereof in transverse section taken on the line 3—3 of Fig. 2 but on a larger scale;

Fig. 4 is a view corresponding to Fig. 2 but showing the towel-bar prior to the application to its interior of the coloring matter; and Fig. 5 is a transverse sectional view thereof taken on the line 5—5 of Fig. 4 but on a larger scale.

In carrying out my invention, I first prepare a relatively-long and slender, transparent, tubular bar 10 of glass, or equivalent transparent material, which may be straight as shown, or bent or curved as desired. The particular tubular bar herein chosen for the illustration of my invention is of straight form and preferably has its respective opposite ends 11—11 slightly tapered as shown for being fitted into suitable sockets formed in the usual supporting-brackets 12—12 adapted to be applied to a wall or like surface.

To the surface of the hollow interior 13 of the tubular bar above referred to I apply a preferably translucent coating 14 of initially-fluid coloring matter such as lacquer which may be specially adapted for adhesion to glass.

The coating 14 of initially-fluid coloring matter above referred to may be applied to the interior of the tubular bar 10 in any suitable manner, such as by spraying the coloring matter therein, though I prefer to flood the entire hollow interior 13 with colored lacquer or like material in order to insure a perfect coating.

The coating of the interior of the tubular bar just referred to may be accomplished by flowing the fluid coloring matter through the tube or by stopping one end thereof and filling the interior 13 and then either inverting the bar to remove the excess fluid, or removing the stopper and permitting the fluid to flow outward through the end of the bar opposite from that into which the coloring matter was introduced.

By means of my invention, I not only provide a stronger article and effect an economy of glass or similar material by employing a tubular bar, rather than a solid bar, but in addition I am enabled to obtain a degree of uniformity and an attractiveness in the coloring effects that it has been impossible to attain heretofore, at any comparable production cost. In fact, even with the use of the relatively expensive processes that must be followed in introducing the coloring in the molten material and producing the pigmentized glass, the uniformity of the coloring of the completed product cannot be predetermined or controlled with the degree of accuracy that is essential to standardized production, whereas, in the practicing of the present invention this is entirely feasible. As will be manifest, the coating 14, by being internally applied to the tube, is protected thereby against wear, abrasion or other disfigurement, so that the potential period of durability of the coloring is many times greater than in similar articles where the coloring is externally applied.

From the foregoing, it will be apparent that by utilizing my invention, as described, I am not only enabled to simulate pigmentized glass, at a fraction of the cost of production of the latter, but my product possesses certain advantages that are inherent to the practicing of my invention, which are not present in pigmentized glass articles of similar types or in those manufactured by other applied color processes, my internally coated tubes having a novel appearance and an appeal to the aesthetic sense that is not approached by any available articles of the same general character; in fact, an illusion of great strength and rigidity is imparted to the tubing by the application of the color, which gives to the wall an appearance of appreciably greater thickness than it actually possesses.

I claim:

1. As a new article of manufacture, a length of transparent glass tubing having its inner wall uniformly coated with an adhering translucent coloring material, to simulate translucent colored glass, the bore of the tube being unobstructed from end to end.

2. As a new article of manufacture, a length of transparent glass tubing of a substantially uniform internal diameter, the inner wall of said tubing being coated with a colored lacquer, disposed thereupon to preserve the uniformity of the internal diameter thereof, said coated glass simulating a rod produced from a pigmentized glass compound.

In testimony whereof, I have signed this specification.

HERMAN L. WITTSTEIN.